March 3, 1964 J. B. REID ETAL Re. 25,529

METHOD FOR DETACHING AN INSOLE ADHESIVELY SECURED TO A SHOE LAST

Original Filed Sept. 10, 1962 3 Sheets-Sheet 1

INVENTORS
JOHN B. REID
BY ROBERT A. SPENCE
Cushman, Darby & Cushman
ATTORNEYS

INVENTORS
JOHN B. REID
BY ROBERT A. SPENCE
Cushman, Darby & Cushman
ATTORNEYS

INVENTORS
JOHN B. REID
BY ROBERT A. SPENCE
Cushman, Darby & Cushman
ATTORNEYS

United States Patent Office

Re. 25,529
Reissued Mar. 3, 1964

25,529

METHOD FOR DETACHING AN INSOLE ADHESIVELY SECURED TO A SHOE LAST

John B. Reid, Brighton, and Robert A. Spence, South Lincoln, Mass., assignors to Bain Corporation, Cambridge, Mass., a corporation of Massachusetts Original No. 3,106,730, dated Oct. 15, 1963, Ser. No. 222,709, Sept. 10, 1962. Application for reissue Nov. 7, 1963, Ser. No. 322,263
3 Claims. (Cl. 12—142)

Matter enclosed in heavy brackets [ ] appears in the original patent but forms no part of this reissue specification; matter printed in italics indicates the additions made by reissue.

This invention generally relates to the manufacture of footwear and, more particularly, to a novel method for detaching an insole of a shoe, or similar article of footwear, when it is adhesively adhered to the bottom of a shoe last as a step in the manufacturing procedure.

The desirability of easy removal of a shoe, or similar article of footwear, from its last as a step in the manufacture of the shoe is obvious and greatly desired by shoe manufacturers. The size of some shoes, the configurations of the lasts used and the fact a shoe may be very tightly pulled over and around the last as a part of the lasting operation may serve to make removal of the shoe a matter of some effort by the operator.

It is the primary object of the present invention to minimize the effort of the operator in "pulling" or separating the shoe from the last when the shoe has been adhesively secured to the last, whereby the adhesive bond between the shoe last bottom and the insole may be initially broken prior to any effort of the operator directed conventionally towards removing the shoe from the last.

The method of this invention is to interpose a charge of compressed air between the contacting area of the last bottom and insole that are not bonded with the pressure-sensitive adhesive, thereby permitting the generation of forces against the insole in an upward direction away from the bottom of the shoe last, sufficient in magnitude to exceed either adjacent adhesive bond between the insole and the contacting face of the pressure-sensitive adhesive or the adhesive bond between the last bottom and related contacting face of the pressure-sensitive adhesive. When the adhesive bond between the insole and the bottom of the shoe last has been broken, the last may be withdrawn by the operator from the shoe in any conventional manner.

Other objects and the entire scope of the present invention will become apparent from the following detailed description and by reference to the accompanying drawings. It should be understood, however, that the detailed description and specific examples, while indicating the preferred embodiments of the invention, are given by way of illustration only, since various changes and modifications within the spirit and scope of the invention will become apparent as the description herein progresses.

Reference now being made to the accompanying drawings which form a part hereof, wherein like numerals refer to similar parts throughout, and in which.

Figure 1:
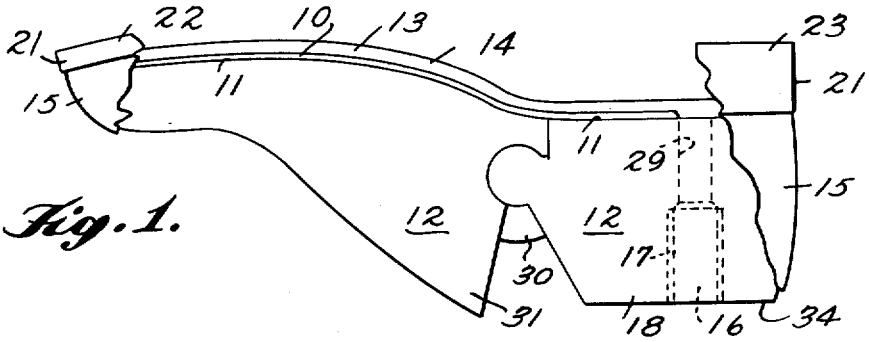
FIGURE 1 is a side elevational view of a conventional last mounted within a shoe, with parts of the shoe removed, the shoe being adhesively secured to the bottom of the last.
Figure 2:
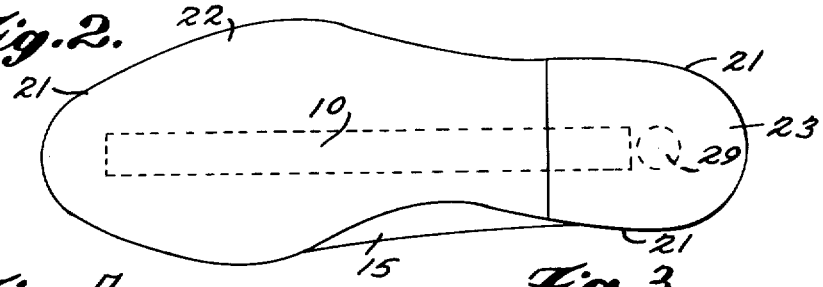
FIGURE 2 is a plan view of the shoe and related last shown in FIGURE 1.

Referring now in detail to the drawings, FIGURE 1 generally illustrates a last 12 of conventional configuration, the bottom surface 11 of which has been detachably secured to the inner foot contacting surface 13 of an insole 14 by means of a double-faced, pressure-sensitive adhesive in the form of a strip of tape 10 previously applied as a step in the manufacture of the shoe to form an assembled unit in the manner more fully described in our copending application Serial No. 150,037, filed November 3, 1961, now Patent No. 3,052,904 granted September 11, 1962; the disclosure of which is incorporated herein by reference, as a part hereof.

Figure 3:
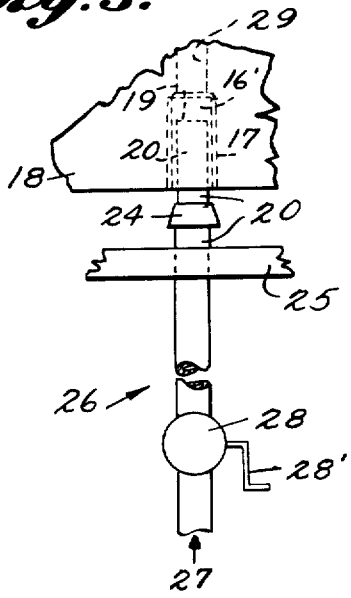
FIGURE 3 is a schematic elevational view of a method of providing a sealable connection between a compressed air supply and the shoe last illustrated in FIGURES 1 and 2, with portions of the shoe and last removed.

When it is desired to remove the finished shoe 15 from the last 12, the operator places the combined shoe and last structure over the end 19 of a hollow cylinder 20, shown in FIGURE 3, inserting the open end 19 into the cavity 16 of a thimble 17 located in the heel part 18 of the last 12. The operator then presses the shoe 15 and last 12 downwardly by grasping the shoe along the outside edge 21 of the outer sole 22 and heel 23 so that the thimble 17 will engage a frustro-conical seal 24 made of a flexible rubber compound, or other like material, and affixed as shown on the outside of hollow cylinder 20. The hollow cylinder 20 is rigidly mounted on a suitable support 25 and connected to a controlled system of compressed air through suitable piping generally designated by the numeral 26. The air piping system 26 is in turn interconnected with a pressure-regulated supply of compressed air 27 through a suitable quick opening, normally closed (spring returned) valve 28 which may be actuated by a foot pedal 28' for controlling the supply of compressed air 27 to the hollow cylinder 20 as desired by the operator.

Figure 5:
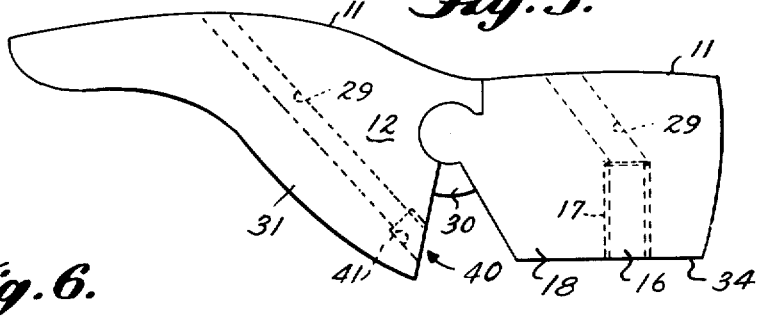
FIGURE 5 is a side elevational view of a conventional last modified in accordance with the present invention, showing air passageways in the heel and forepart of the last.
Figure 6:
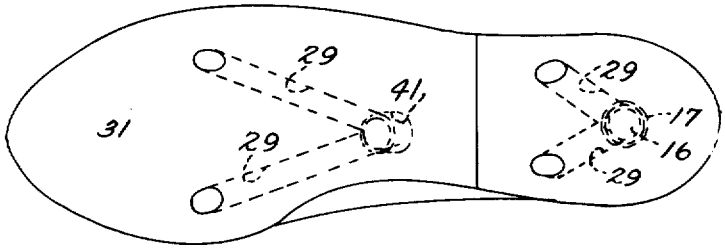
FIGURE 6 is a plan view of the last illustrated in FIGURE 5.

Extending between the top of the cavity 16 and the bottom surface 11 of the last 12 are one or more air passageways 29. FIGURES 5 and 6 illustrate suitable locations for a plurality of passageways 29 interconnecting the cavity 16 with the bottom surface 11 of the last. Pressing downwardly on the shoe, as previously described, the operator actuates pedal 28' to open the valve 28, allowing the compressed air from supply 27 to flow through the piping system 26 into hollow cylinder 20 which in turn conducts the air into the thimble cavity 16 where it is then directed through air passageway 29 to the bottom surface 11 of the last 12 where it is discharged.

The expelled charge of compressed air continues to build up a pressure between the bottom surface 11 of the last 12 and that portion of the foot-contacting surface of the insole 14 not directly secured to the strip 10 of pressure-sensitive, double-faced material until the force developed by the charge of compressed air, acting upwardly against the insole foot-contacting surface 13 and downwardly against the bottom surface 11 of the last 12, exceeds the amount of the adhesive bond provided by the strip of double-faced, adhesive material 10, thereby breaking the adhesive bond and separating the last 12 from the insole 14.

In this action the insole 14 balloons slightly away from the bottom surface 11 of the last 12. After the adhesive bond between the insole 14 and the last bottom 11 has been ruptured, the assembled shoe may be "pulled" or removed from the last 12 in a conventional manner without damage to either element.

There may be some leakage of air from the space between the bottom 11 of the shoe last 12 and the insole area not attached to the double-faced, pressure-sensitive adhesive material, and an additional amount of compressed air must, therefore, be supplied to compensate for this leakage. The charge of compressed air should interpose with sufficient rapidity to quickly build up a sufficient pressure to raise the insole upwardly from the bottom of the shoe last an amount sufficient to break the adhesive bond between the last bottom 11 and the insole 14.

Figure 4:
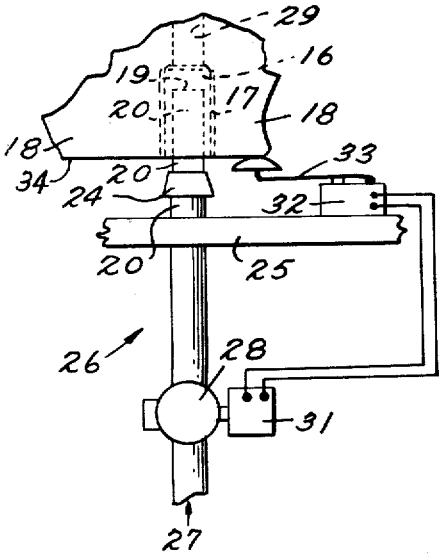
FIGURE 4 is a schematic elevational view of a method of providing a sealable between the compressed air supply and the shoe last illustrated in FIGURES 1 and 2 with portions of the shoe and last removed, and showing an electrical switch for controlling the compressed air supply.

As shown in FIGURE 4, the charge of compressed air 27 supplied to the system 26 may be controlled by a valve 28 actuated by an electrical solenoid 31 connected to a microswitch 32 mounted on support 25 with the microswitch actuating arm 33 contacting the bottom surface 34 of the last heel 18 when the assembled last and shoe are pressed downwardly over hollow tube 20.

Figure 8:
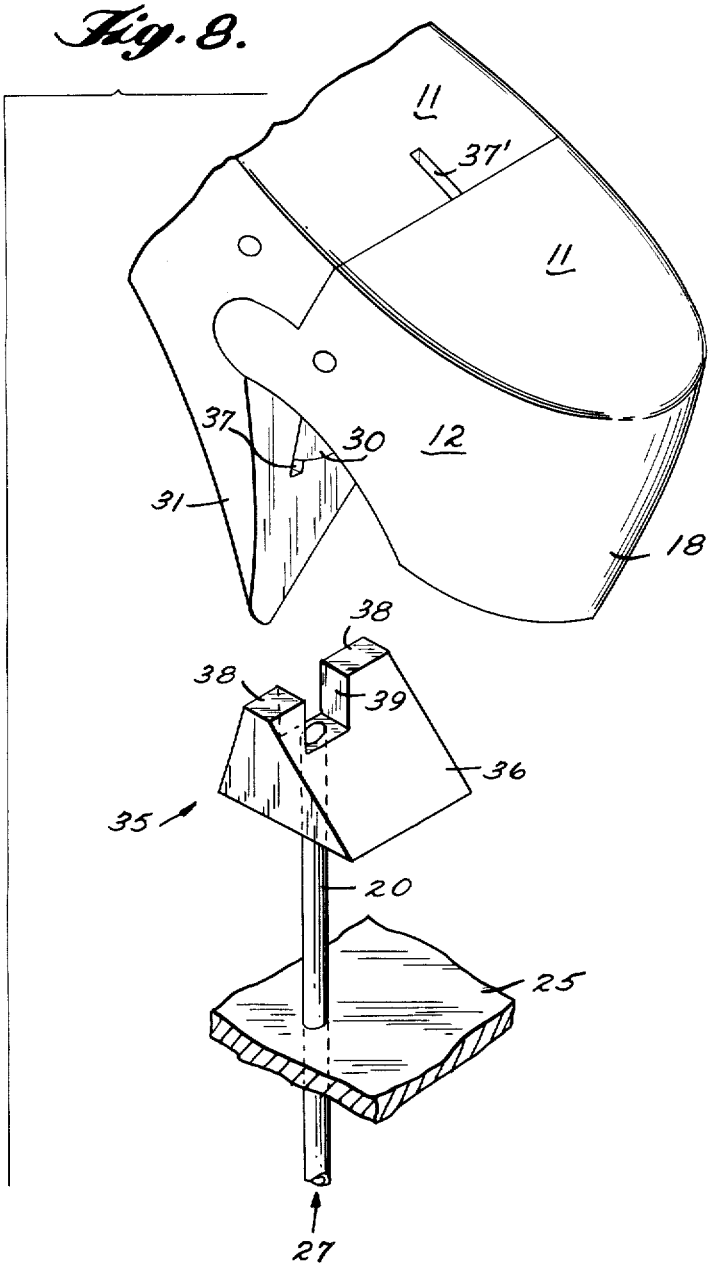
FIGURE 8 is an exploded perspective view illustrating an air supply connection with a flexible wedge tip to sealably contact a complementary opening formed between the heel and forepart of the shoe last.

Another method of providing a supply of compresssed air 27 into the space between the insole 14 and the last bottom surface 11 is by a resiliently-sealed connection generally illustrated by the numeral 35, as indicated in FIGURE 8. This wedge-shaped connection 36 is secured to the top of hollow tube 20 which is, in turn, mounted rigidly on support 25 in the manner shown in FIGURE 8. A slot 39 is cut into the top surface 38 of the wedge connection 36 for clearance of the last hinge mechanism 30 when the wedge connection 36 is inserted into the opening formed between the forepart 31 and the heel part 18 of the last 12 and the assembled unit is pressed downwardly against the connection 36 on the tube 20. The connection 36 may be conveniently made of a resilient rubber or other suitable material and serves as a seal between tube 20 and the last cavity 37 containing hinge mechanism 30 so that the cavity 37 serves as a passage or part of the passage for the compressed air to the bottom surface 11 of last 12.

A further method of supplying a charge of compressed air, as required above, would be to provide one or more air passages connecting between a portion of the forepart 31 of the last 12 accessibly revealed at the completion of the manufacture of the shoe 15, and a portion of the last bottom 11 not covered by the double-faced, pressure-sensitive adhesive material 10.

Referring now to FIGURES 5 and 6, passageways 29 connect the bottom surface 11 of the last forepart 31 with an opening 41 formed in surface 40 that defines a portion of the wedge-shaped opening between forepart 31 and heel part 18 into which hollow tube 20 may be inserted.

The hollow cylinder 20 attached to a rigid support 25 may also be utilized as a means to "break" the last 12 as a step in the manufacture of the shoe 15 when the shoe is being removed from the last 12, thereby performing two uses.

Figure 7:
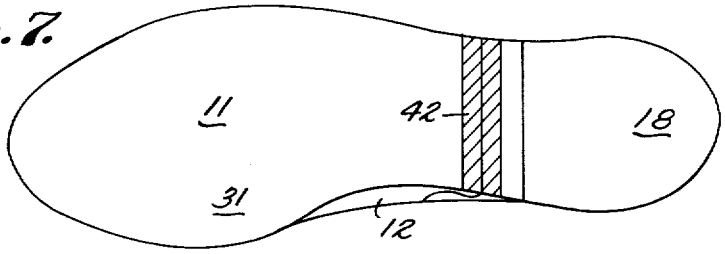
FIGURE 7 is a plan view of a last illustrating an area of the last bottom to which a special treatment may be applied.

FIGURE 7 is a plan view showing the bottom surface 11 of the forepart 31 and heel part 18 of the last 12. If a coating in strip form 42, indicated by the cross-hatched area of FIGURE 7, is applied to the heel side of the joint between the forepart 31 and heel part 18, it will assist in retaining the strip of tape 10 in one piece when the last 12 is "broken" for removal of the shoe 15. A coating of beeswax or silicone is suitable for this purpose.

We provide the surface of the bottom portion of the last at 42 with an area constituted by a thin wax or silicone film on which the pressure-sensitive adhesive or tape will not adhere to the last. Consequently, when the last is broken at the hinge, and the strip of tape adheres to the last, this area of non-adherence 42 between the tape and the bottom of the last will not only facilitate the separation of the two, i.e., the insole will readily peel off of the last together with the assembled footwear, as in the other forms of the invention described above but particularly it assures that the tape adhering to the last will remain in one piece without fracture when the last is broken. In many instances, this is found useful since it assures that when the tape has to be stripped from the last this can be done in one piece as distinguished from being split into two or more pieces, i.e., one on the heel and the other on the forepart of the last.

While we have described above, in connection with FIGURE 3, the operation of the valve 28 by foot control, other means of manual control may be utilized, e.g., knee actuation, hand etc., or electrical actuation as described in connection with FIGURE 4. In this latter figure, the movement downwardly of the combination of the assembled shoe and last by the operator will cause either the last or shoe to engage the lever arm 33 which is located in their downward path of movement to thereby automatically actuate the valve 28 connected with the supply of compressed air charge 27 so that the latter will be directed to the area between the bottom of the last 11 and the opposed foot contacting surface 13 of the insole. While we have described this automatic operation in connection with an electrically actuated structure, this automatic actuation may be accomplished mechanically by connecting the lever 33 to the manually operated means described above, e.g., the pedal 28'. In this manner the quick opening normally closed valve (spring returned) will be operated automatically in the same manner as the automatic electrical system described in connection with FIGURE 4.

Referring to FIGURES 5 and 6, the hollow cylinder 20 is inserted in the recess or cavity 41 or the cavity 16, or the cylinder 20 may have two branches to simultaneously enter and supply air to each cavity, the branch being preferably formed of some flexible tubing for this purpose.

Again referring to FIGURE 8, it is to be understood that the cavity 37 containing the hinge 30 may constitute the only passage through the last to the bottom portion thereof or the last at this hinge area may be modified to enlarge or extend such passage as best shown in FIGURE 8 at 37' in the bottom surface 11 of the last. In other words, the passage 37 and 37' will be simply through the hinge cavity formed in forepart 31 of the last or through the enlarged or extended opening formed in the bottom surface 11 at 37' of the last 12 as illustrated in FIGURE 8.

In this invention, we break the attachment between the last and insole on either side of the adhesive tape 10 by the pneumatic pressure in the manner described. This pneumatic development is useful also in assisting an operator in pulling the assembled footwear from the last on which it has been assembled.

We have referred above to automatic mechanical operation of the valve 28 and it is to be understood that any suitable mechanical connection, e.g., a suitable system of levers is employed for this purpose. A spring may be utilized with the lever system to assist the spring employed for normally closing the valve 28 after it has been automatically opened by engagement with the last or assembled shoe.

The pressure supplied to the pneumatic system through inlet 27 varies between 30 and 80 lbs. gauge. It will depend upon the area of the aligned insole and bottom portion or adjacent face of the last and strength of the adhesive. The time of application of the air pressure will usually be of the order of one second, more or less, and the volume of the air introduced likewise will be determined by the size of the shoe, the area of the tape connection, the strength of the adhesive as well as the pressure.

The present invention may thus be seen to completely and effectively accomplish the objects enumerated hereinabove by releasing the adhesive bond established with the double-faced, pressure-sensitive adhesive material interposed between the insole supporting bottom surface of a last and the insole portion of a shoe mounted on the last so that the latter may be easily and conveniently removed without damage to either the shoe insole or related supporting last. It will be realized, however, that various changes and substitutions may be made to the specific embodiments disclosed herein without departing from the principles of this invention encompassed within the spirit and scope of the following appended claims.

We claim:

1. A method of manufacturing footwear comprising the steps of (1) detachably securing an insole member to a related last member by an adhesive material [interposed therebetween having opposed pressure-sensitive faces which] *in order to* adhesively bond said members in assembled relation during assembly of footwear on said last (2) detaching said members by directing a charge of air therebetween of sufficient pressure to rupture said adhesive bond and (3) removing said last from said footwear.

2. A method of manufacturing footwear, as defined in claim 1, wherein said charge of air is simultaneously directed between rear and forepart portions of said last and insole.

3. A method of manufacturing footwear, as defined in claim 2, including the additional step of continuing to apply said charge of air between said members until said last is at least partially removed from said footwear.

References Cited in the file of this patent or the original patent

UNITED STATES PATENTS

| | | |
|---|---|---|
| 1,365,221 | Blake | Jan. 11, 1921 |
| 1,790,191 | Winkley | Jan. 27, 1931 |
| 2,047,960 | Hadoway | July 21, 1936 |
| 2,093,435 | Grush | Sept. 21, 1937 |
| 2,093,436 | Grush | Sept. 21, 1937 |
| 2,277,769 | MacDonald | Mar. 31, 1942 |
| 2,532,011 | Dahlquist et al. | Nov. 28, 1950 |
| 2,701,887 | Nolan | Feb. 15, 1955 |
| 2,764,768 | Ashley et al. | Oct. 2, 1956 |
| 2,806,233 | Hubart et al. | Sept. 17, 1957 |
| 3,052,904 | Reid et al. | Sept. 11, 1962 |